(12) United States Patent
Kubota et al.

(10) Patent No.: US 8,128,240 B2
(45) Date of Patent: Mar. 6, 2012

(54) OPTICAL UNIT AND PROJECTOR APPARATUS

(75) Inventors: Takashi Kubota, Shizuoka (JP); Katumi Muramatu, Shizuoka (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 12/628,253

(22) Filed: Dec. 1, 2009

(65) Prior Publication Data

US 2010/0073645 A1   Mar. 25, 2010

(30) Foreign Application Priority Data

Dec. 3, 2008   (JP) ................................ P2008-308451

(51) Int. Cl.
    *G03B 21/14*   (2006.01)

(52) U.S. Cl. .......................................... 353/119; 353/57

(58) Field of Classification Search .............. 353/52–61, 353/119, 503
See application file for complete search history.

(56) References Cited

U.S. PATENT DOCUMENTS

| 7,216,989 | B2 * | 5/2007  | Sakurai         | 353/57  |
|-----------|------|---------|-----------------|---------|
| 7,854,520 | B2 * | 12/2010 | Tsuboi          | 353/119 |
| 7,862,185 | B2 * | 1/2011  | Noba            | 353/119 |
| 7,891,826 | B2 * | 2/2011  | Fujinawa et al. | 353/119 |

FOREIGN PATENT DOCUMENTS

JP   2006 11298   1/2006

\* cited by examiner

*Primary Examiner* — Seung C Sohn
(74) *Attorney, Agent, or Firm* — Frommer Lawrence & Haug LLP; William S. Frommer

(57) ABSTRACT

An optical unit includes a frame; an optical member having a rectangular plate-shape; and a pair of mount portions formed in the frame, each holding a side of the optical member. Each of the mount portions includes an insertion slot into which an end of the optical member in the width direction is inserted. The insertion slot is formed between first and second walls of the frame. The first wall includes a thickness direction positioning surface that is in contact with one of the surfaces of the optical member in a thickness direction. The second wall includes an inclined surface. The optical member is fixed to the frame using an adhesive in a state in which the one of the surfaces of the optical member is pressed against the thickness direction positioning surface and an end of the optical member in the height direction is pressed against the inclined surface.

6 Claims, 10 Drawing Sheets

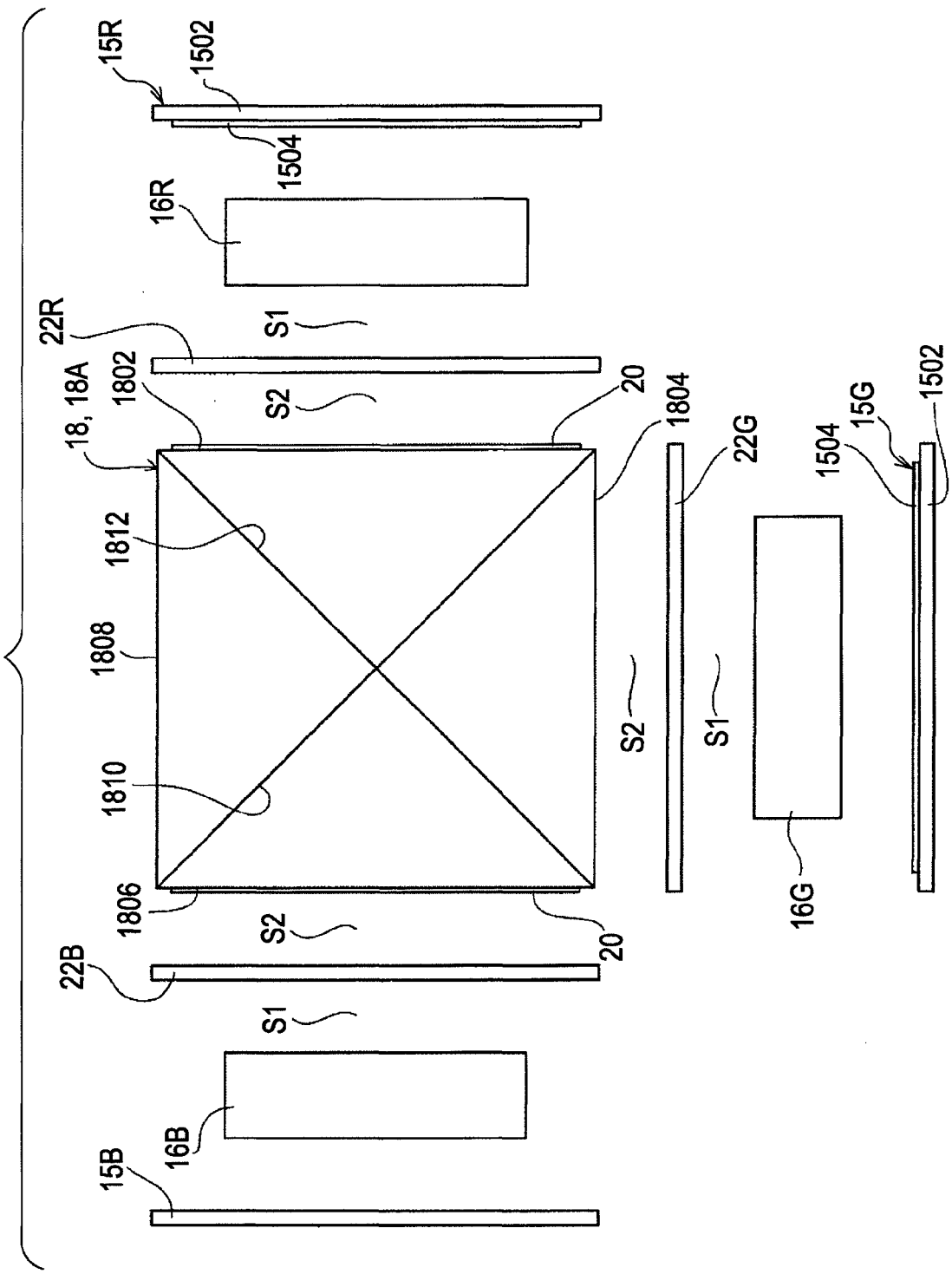

OPTICAL UNIT AND PROJECTOR APPARATUS

BACKGROUND OF THE INVENTION

1. Field of the Invention

The present invention relates to an optical unit and a projector apparatus.

2. Description of the Related Art

An existing projector apparatus includes a separation unit for separating light from a light source unit into red light, green light, and blue light; three optical modulators each provided for modulating a corresponding color of light, which has been separated by the separation unit, in accordance with image information; a light combining unit for combining light from the optical modulators and outputs light that has been combined; and a projection optical system for projecting light from the light combining unit onto a screen (see Japanese Unexamined Patent Application Publication No. 2006-11298).

The separation unit of the projector apparatus includes a plurality of rectangular plate-shaped optical members including dichroic filters and reflection mirrors. The optical members are each mounted on a pair of mount portions formed on a frame of the projector apparatus, each pair of mount portions holding the sides of the optical member in the width direction.

Each of the mount portions includes an insertion slot into which the optical member can be inserted from above; a positioning surface that is in contact with one of the surfaces of the optical member in the thickness direction so as to position the optical member; and a plate spring incorporated into the insertion slot so as to press one of the surfaces of the optical member against the positioning surface.

The optical member is mounted on the frame in such a manner that the plate springs urge the optical member to be in contact with the positioning surface and an upper portion of the optical member is immovably fixed to the frame using a lid member attached to the frame.

SUMMARY OF THE INVENTION

However, with this technique, a pair of plate springs are necessary for each optical member. Therefore, if there are five optical members, ten plate springs are necessary. Moreover, lid members are necessary to fix the optical members.

Thus, the plate springs occupy a large space and the weight of the plate springs is heavy, which is disadvantageous in reducing the size and weight of the projector apparatus.

Moreover, a large number of components including a large number of plate springs and lid members are necessary, and operations for attaching the large number of plate springs and lid members are cumbersome, which are disadvantageous in cost reduction.

In view of such a background, it is desirable to provide an optical unit and a projector apparatus that are advantageous in reducing the size, the weight, and the cost thereof.

According to an embodiment of the present invention, an optical unit includes a frame; an optical member disposed on the frame, the optical member having a rectangular plate-shape having a width, a height, and a thickness; and a pair of mount portions formed in the frame, each of the mount portions holding a side of the optical member in a width direction, wherein each of the mount portions includes an insertion slot into which an end of the optical member in the width direction at an end of the optical member in a height direction is inserted in the height direction, wherein the insertion slot includes an opening and a bottom facing each other in a depth direction of the insertion slot, wherein the insertion slot is formed between a first wall and a second wall of the frame, the first and second walls facing each other, wherein the first wall includes a thickness direction positioning surface that is in contact with one of the surfaces of the optical member in a thickness direction, the optical member being inserted into the insertion slot, so that the optical member is positioned in the thickness direction, wherein the second wall includes an inclined surface near the bottom of the insertion slot, the inclined surface being inclined such that the distance between the inclined surface and the thickness direction positioning surface decreases with decreasing distance from the bottom, and wherein the optical member is fixed to the frame using an adhesive applied between the frame and the optical member in a state in which the one of the surfaces of the optical member is pressed against the thickness direction positioning surface and an end of the optical member in the height direction on the other of the surfaces of the optical member in the thickness direction is pressed against the inclined surface.

According to an embodiment of the present invention, a projector apparatus includes a light source unit; a separation unit for separating light from the light source unit into a plurality of light beams having wavelength ranges different from each other; a plurality of optical modulators each for modulating a corresponding one of the light beams, which has been separated by the separation unit, in accordance with an image information and outputting modulated light beam; a light combining unit for combining the modulated light beams from the plurality of optical modulators; and a projection optical system for projecting light outputted from the light combining unit onto a screen. The separation unit includes a frame; an optical member disposed on the frame, the optical member having a rectangular plate-shape having a width, a height, and a thickness, the optical member transmitting or reflecting light; and a pair of mount portions formed in the frame, each of the mount portions holding a side of the optical member in a width direction, wherein each of the mount portions includes an insertion slot into which an end of the optical member in the width direction at an end of the optical member in a height direction is inserted in the height direction, wherein the insertion slot includes an opening and a bottom facing each other in a depth direction of the insertion slot, wherein the insertion slot is formed between a first wall and a second wall of the frame, the first and second walls facing each other, wherein the first wall includes a thickness direction positioning surface that is in contact with one of the surfaces of the optical member in a thickness direction, the optical member being inserted into the insertion slot, so that the optical member is positioned in the thickness direction, wherein the second wall includes an inclined surface near the bottom of the insertion slot, the inclined surface being inclined such that the distance between the inclined surface and the thickness direction positioning surface decreases with decreasing distance from the bottom, and wherein the optical member is fixed to the frame using an adhesive applied between the frame and the optical member in a state in which the one of the surfaces of the optical member is pressed against the thickness direction positioning surface and an end of the optical member in the height direction on the other of the surfaces of the optical member in the thickness direction is pressed against the inclined surface.

With an embodiment of the present invention, an optical member is positioned by using a thickness direction positioning surface and an inclined surface, and, in a state in which the optical member has been positioned, the optical member is attached to a frame using an adhesive.

Therefore, two plate springs for fixing an optical member, which are used in the existing technique, are not necessary, which is advantageous in reducing the size and weight of the projector apparatus.

In particular, the embodiment is suitable for a projector apparatus including a large number of optical members such as dichroic filters and reflection mirrors.

BRIEF DESCRIPTION OF THE DRAWINGS

FIG. 2 is an explanatory view illustrating the structure of a light combining unit of the projector apparatus of the embodiment;

DESCRIPTION OF THE PREFERRED EMBODIMENTS

Hereinafter, an embodiment of the present invention is described with reference to the drawings.

Figure 1:
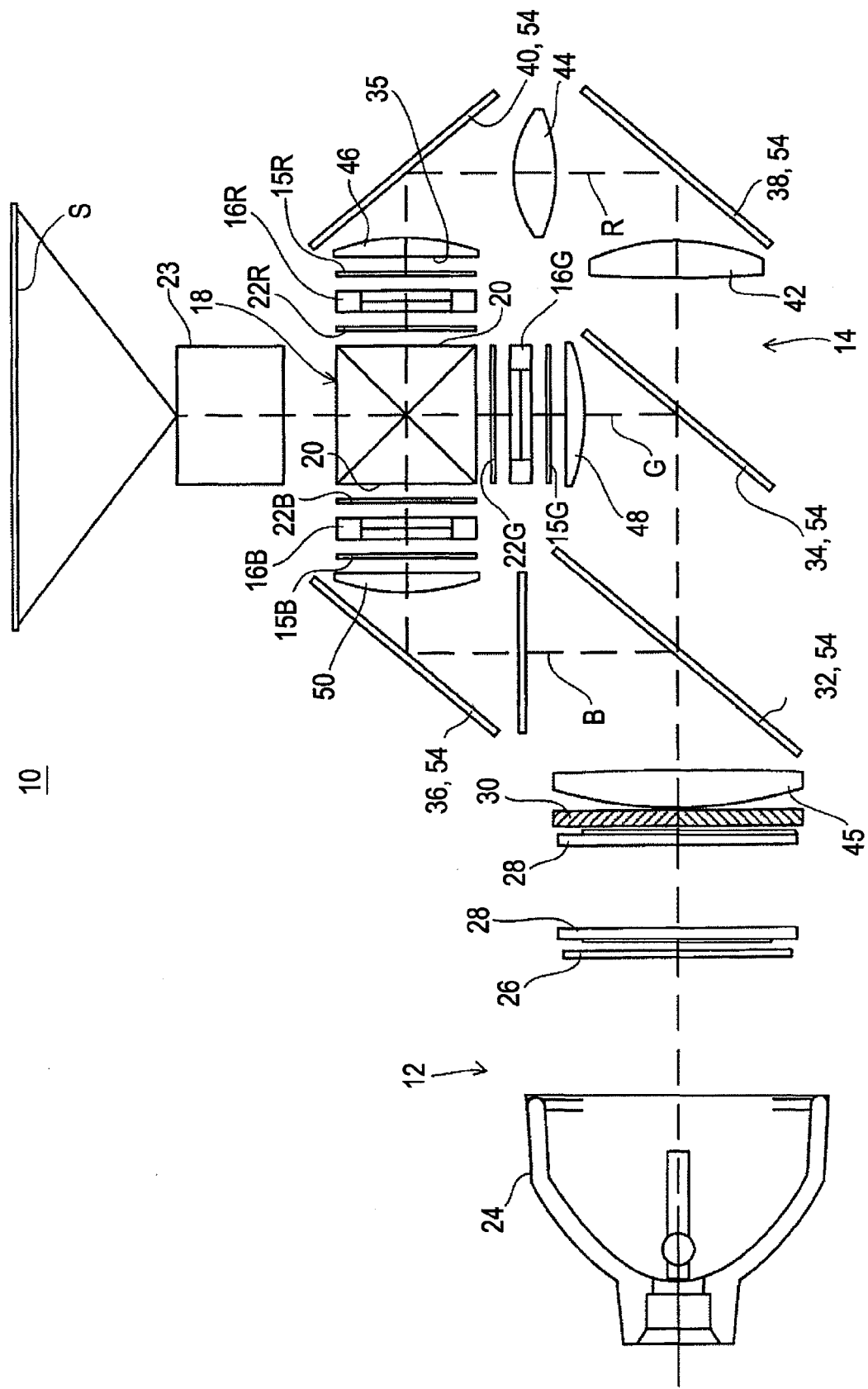
FIG. 1 is an explanatory view illustrating the structure of a projector apparatus of an embodiment of the invention.

FIG. 1 is an explanatory view illustrating the structure of a projector apparatus 10 of the embodiment. FIG. 2 is an explanatory view illustrating the structure of a light combining unit 18 of the projector apparatus 10 of the embodiment.

As shown in FIG. 1, the projector apparatus 10 includes a light source unit 12, a separation unit 14; red-channel, green-channel, and blue-channel optical modulators 16R, 16G, and 16B; the light combining unit 18; and a projection optical system 23. The embodiment of the present invention is applied to the separation unit 14.

The projector apparatus 10 further includes a retardation film 20; red-channel, green-channel, and blue-channel input polarizers 15R, 15G, and 15B; and red-channel, green-channel, and blue-channel output polarizers 22R, 22G, and 22B.

Figure 4:
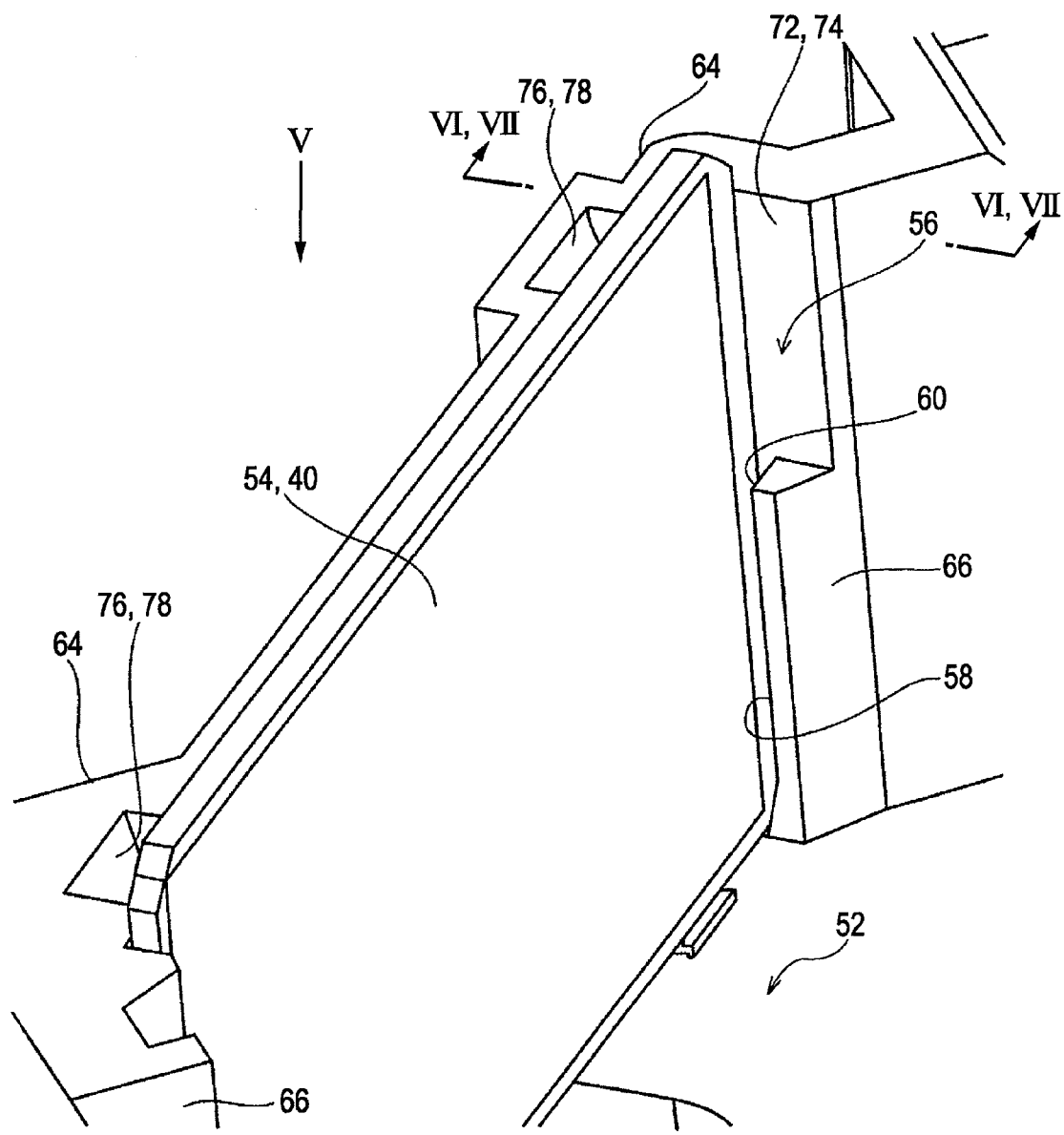
FIG. 4 is a perspective view illustrating the mounting structure of an optical member.

The projector apparatus 10 further includes a frame 52 (see FIG. 4).

On the frame 52, the light source unit 12; the separation unit 14; the input polarizers 15R, 15G, and 15B; the optical modulators 16R, 16G, and 16B; the light combining units 18; the output polarizers 22R, 22G, and 22B; and the projection optical system 23 are mounted.

Light Source Unit 12

The light source unit 12 includes a light source 24, a UV cut filter 26, fly-eye lenses 28, a PS converter 30, and a condenser lens 45.

The light source 24 emits white light. As the light source 24, an existing lamp that emits white light, such as a ultra high pressure lamp or a xenon lamp, can be used.

The UV cut filter 26, which is disposed in front of the light source 24, prevents ultraviolet rays emitted by the light source 24 from passing therethrough.

The fly-eye lenses 28, which are disposed in front of the UV cut filter 26, uniformize the illumination distribution of light that has passed through the UV cut filter 26 so that the effective areas of the optical modulators 16R, 16G, and 16B can be uniformly irradiated with the light.

The embodiment includes a plurality of the fly-eye lenses 28.

The PS converter 30 aligns the polarization directions of light, which has been guided by the fly-eye lenses 28, in a predetermined direction. To be specific, the PS converter 30 directly transmits S-waves (linearly-S-polarized light) of the polarized components of light, and converts polarized components other than the S-waves to S-waves and transmits the converted S-waves.

The condenser lens 45 converges light transmitted by the PS converter 30.

Separation Unit 14

The separation unit 14 separates light from the light source unit 12 into R (red) light, G (green) light, B (blue) light, whose wavelength ranges are different from each other. In other words, the separation unit 14 separates light from the light source unit 12 into red, green, and blue light, whose wavelength ranges are different from each other.

The separation unit 14 includes first, second, and third dichroic filters 32, 34, and 35; and first, second, and third reflection mirrors 36, 38, and 40.

In the embodiment, the first and second dichroic filters 34 and 36 are dichroic mirrors. The third dichroic filter 35 is a dichroic coating formed on an exit surface of the condenser lens 46 described below.

In the embodiment, each of the first and second dichroic filters 32 and 34, and the first, second, and third reflection mirrors 36, 38, and 40 corresponds to an optical member.

An operation of mounting the optical member is described below in detail.

The first, second, and third dichroic filters 32, 34, and 35 are described.

Figure 3A:
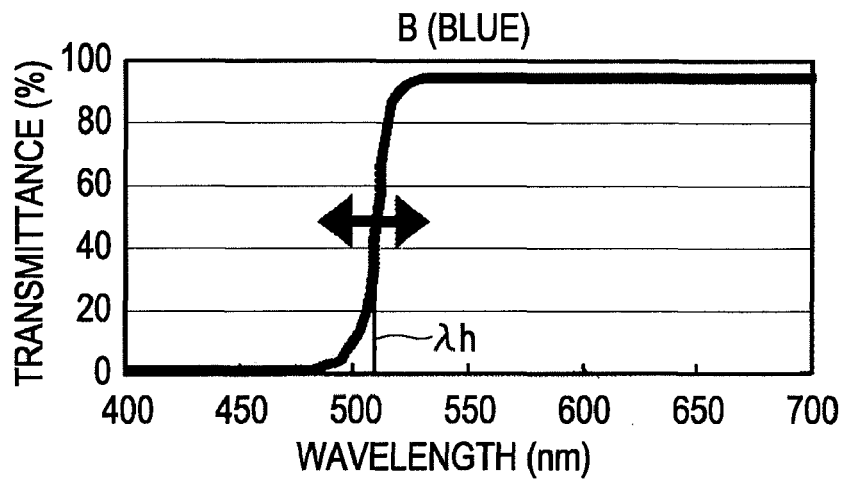
FIG. 3A is a schematic graph illustrating a spectrum of wavelength vs. transmittance of a first dichroic filter.
Figure 3B:
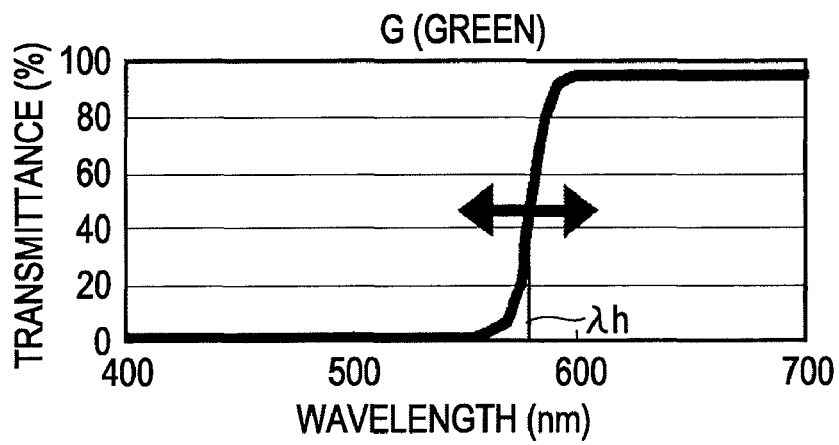
FIG. 3B is a schematic graph illustrating a spectrum of wavelength vs. transmittance of a second dichroic filter.
Figure 3C:
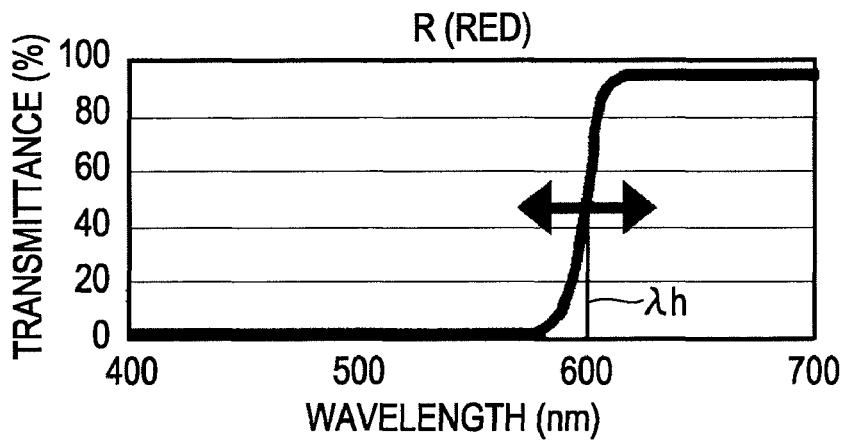
FIG. 3C is a schematic graph illustrating a spectrum of wavelength vs. transmittance of a third dichroic filter.

FIG. 3A is a schematic graph illustrating a spectrum of wavelength vs. transmittance of the first dichroic filter 32. FIG. 3B is a schematic graph illustrating a spectrum of wavelength vs. transmittance of the second dichroic filter 34. FIG. 3C is a schematic graph illustrating a spectrum of wavelength vs. transmittance of the third dichroic filter 35.

As shown in FIG. 3A, the first dichroic filter 32, which corresponds to an optical member, selectively reflects light in the blue wavelength range, which is a part of light guided from the light source unit 12. The first dichroic filter 32 transmits light outside the blue wavelength range, that is, light including the green and red wavelength ranges.

As shown in FIG. 3B, the second dichroic filter 34, which corresponds to an optical member, selectively reflects light in the green wavelength range, which is part of light that has been transmitted through the first dichroic filter 32, so that the light in the green wavelength range travels through the green-channel input polarizer 15G toward the green-channel optical modulator 16G. The second dichroic filter 34 transmits remaining light including the red wavelength range.

As shown in FIG. 3C, the third dichroic filter 35 selectively transmits light in the red wavelength range, which is a part of light that has passed through the second dichroic filter 34.

The first reflection mirror 36, which corresponds to an optical member, reflects the light B in the blue wavelength range, which has been separated by the first dichroic filter 32, so that the light B in the blue wavelength range travels through the blue-channel input polarizer 15B (described below) toward the blue-channel optical modulator 16B.

The second reflection mirror 38, which corresponds to an optical member, reflects the light including the red wavelength range, which has been separated by the second dichroic filter 34, toward the third reflection mirror 40.

The third reflection mirror 40, which corresponds to an optical member, reflects the light including the red wavelength range, which has been reflected by the second reflection mirror 38, so that the light including the red wavelength range travels through the third dichroic filter 35 and the red-channel input polarizer 15R (described below) toward the red-channel optical modulator 16R.

FIG. 1 also shows relay lenses 42 and 44 for adjusting the optical path length of the light R; and condenser lenses 46, 48, and 50 for converging the light R, G, and B, respectively.

As long as the separation unit 14 can separate light from the light source unit 12 into red, green, and blue light, the structure of the separation unit 14 is not limited to the structure described above. Various existing types of structure can be used for the separation unit 14.

Optical Modulators 16R, 16G, 16B

The optical modulators 16R, 16G, and 16B are respectively provided for the light R, G, and B, which have been separated by the separation unit 14.

That is, the red-channel optical modulator 16R corresponds to the red light R, the green-channel optical modulator 16G corresponds to the green light G, and blue-channel optical modulator 16B corresponds to the blue light B.

Each of the optical modulators 16R, 16G, and 16B converts the polarization state of light, which has passed through a corresponding one of the input polarizers 15R, 15G, and 15B, in accordance with image information, and transmits the converted light. In other words, the optical modulators adjust the polarization state of light in accordance with image information, thereby modulating the light in accordance with the image information.

To be specific, the optical modulators 16R, 16G, 16B respectively display image information for red, green, and blue.

When a video signal for a color is applied to a corresponding one of the optical modulators 16R, 16G, and 16B, the optical modulator converts the polarization direction of the incident light in accordance with the video signal and transmits the converted light.

In other words, the optical modulators 16R, 16G, and 16B change the incident light from S-polarized light into P-polarized light and outputs the modulated light.

When a video signal for white (the brightest color) is input, the optical modulators 16R, 16G, and 16B convert the polarization direction of incident light from S-polarized to P-polarized, and transmit the converted light. When a video signal for black (the darkest color) is input, the optical modulators 16R, 16G, and 16B keep the polarization direction of incident light S-polarized, and transmit the light.

In the embodiment, each of the optical modulators 16R, 16G, and 16B includes a transmissive liquid crystal panel.

Input Polarizers 15R, 15G, and 15B

Each of the input polarizers 15R, 15G, and 15B is disposed between the separation unit 14 and a corresponding one of the optical modulators 16R, 16G, and 16B. The input polarizers 15R, 15G, and 15B respectively align the polarized components of the light R, G, and B, which have been separated by the separation unit 14, to S-waves.

That is, the red-channel input polarizer 15R corresponds to the red-channel optical modulator 16R, the green-channel optical modulator 16G corresponds to the green-channel input polarizer 15G, and the blue-channel optical modulator 16B corresponds to the blue-channel input polarizer 15B.

Although the polarized components of the light R, G, and B have been aligned to S-waves by the PS converter 30, while the light R, G, and B travel through the mirrors and lenses of the separation unit 14, the polarized components of the light R, G, and B are disturbed, so that the polarized components include components other than S-waves.

Thus, the input polarizers 15R, 15G, and 15B remove the disturbance of the polarized components of the light R, G, and B so as to align the polarized components to S-waves.

The input polarizers 15R, 15G, and 15B are absorptive polarizers, which transmit light having a desired polarization direction and absorbs remaining light.

Absorptive polarizers made of inorganic materials can be used as the input polarizers.

Various types of existing inorganic absorptive polarizers, such as a polarizer using a polarized light absorbing effect due to optical anisotropy of inorganic particulates (hereinafter referred to as "inorganic absorptive polarizer"), can be used.

For example, a type of inorganic absorptive polarizer includes a substrate transparent to a target wavelength band (glass substrate); and inorganic particulates (made of semiconductor or metal), each having shape anisotropy and a size smaller than the target wavelength band, that are deposited on the substrate using a vacuum film forming method such as sputtering or vacuum deposition.

Since the inorganic absorptive polarizer includes the inorganic particulates arranged at intervals smaller than the target wavelength band, the inorganic absorptive polarizer can function as a polarizer by using the polarized light absorbing effect due to the optical anisotropy of the inorganic particulates.

Examples of absorptive polarizers that can be used further include existing organic absorptive polarizers of various types, each of which using a polarizing film made of organic material (hereinafter referred to as "organic absorptive polarizer").

In the embodiment, the organic absorptive polarizers are used for the red-channel input polarizer 15R and the green-channel input polarizer 15G.

That is, as shown in FIG. 2, each of the organic absorptive polarizers (hereinafter referred to "organic polarizer") includes a glass substrate 1502, which is transparent, and a polarizing film 1504, which is made of an organic material and affixed to a surface of the glass substrate 1502 facing a corresponding one of the optical modulators 16R and 16G.

In the embodiment, an inorganic absorptive polarizer (hereinafter referred to as "inorganic polarizer") is used for the blue-channel input polarizer 15B.

The blue-channel input polarizer 15B absorbs blue light, which has a shorter wavelength and hence a higher energy than red light and green light.

Therefore, the blue-channel input polarizer 15B is more easily heated to a high temperature than the red-channel input polarizer 15R and the green-channel input polarizer 15G.

By using an inorganic polarizer having an excellent heat resistance for the blue-channel input polarizer 15B, even if the light source 24 is of a high-powered type, the projector apparatus 10 can continuously project high-quality images onto a screen S for a long period, which is advantageous in increasing the life of the projector apparatus 10.

The red-channel input polarizer 15R and the green-channel input polarizer 15G are not as easily heated to a high temperature as the blue-channel input polarizer 15B. Thus, organic polarizers, which have comparatively low heat resistances, may be used for the red-channel input polarizer 15R and the green-channel input polarizer 15G without affecting the life of the projector apparatus 10.

Because an organic polarizer is less expensive than an inorganic polarizer, the use of organic polarizers is also advantageous in reducing the cost of the projector apparatus 10.

Output Polarizers 22R, 22G, and 22B

Each of the output polarizers 22R, 22G, and 22B includes an inorganic polarizer having an excellent heat-resistance.

The output polarizers 22R, 22G, and 22B respectively transmit P-waves among the polarized components of the light R, G, and B, which have been transmitted by the optical modulators 16R, 16G, and 16B, and absorb unwanted polarized components other than the P-waves.

The red-channel output polarizer 22R corresponds to the red-channel optical modulator 16R, the green-channel optical modulator 16G corresponds to the green-channel output polarizer 22G, and the blue-channel output polarizer 22B corresponds to the blue-channel optical modulator 16B.

The red-channel output polarizer 22R is disposed between the red-channel optical modulator 16R and a first entry surface 1802 in such a manner that spaces S1 and S2 are respectively formed therebetween. In the embodiment, the red-channel output polarizer 22R faces the retardation film 20 described below with the space S2 therebetween.

The green-channel output polarizer 22G is disposed between the green-channel optical modulator 16G and a second entry surface 1804 in such a manner that spaces S1 and S2 are respectively formed therebetween.

The blue-channel output polarizer 22B is disposed between the blue-channel optical modulator 16B and a third entry surface 1806 in such a manner that spaces S1 and S2 are respectively formed therebetween. In the embodiment, the blue-channel output polarizer 22B faces the retardation film 20 described below with the space S2 therebetween.

The output polarizers 22R, 22G, and 22B generate heat as a result of absorbing light having polarized components other than P-waves, the light having been transmitted by the respective optical modulators 16R, 16G, and 16B.

In order to cool the output polarizers 22R, 22G, and 22B, a blower (not shown) such as a fan is provided so as to circulate air through the spaces S1 and S2.

Light Combining Unit 18

As shown in FIG. 2, in the embodiment, the light combining unit 18 includes a light combining prism 18A.

The light combining prism 18A includes first, second, and third entry surfaces 1802, 1804, and 1806; first and second dichroic mirror films 1810 and 1812; and an exit surface 1808.

The first and third entry surfaces 1802 and 1806 are parallel to each other. The second entry surface 1804 and the exit surface 1808 are parallel to each other and perpendicular to the first and third entry surfaces 1802 and 1806.

The first and second dichroic mirror films 1810 and 1812 are perpendicular to each other, and intersect with each of the first, second, third entry surfaces 1802, 1804, 1806, and the exit surface 1808 at an angle of 45 degrees.

The light R, which has been transmitted by the red-channel optical modulator 16R, enters through the first entry surface 1802.

The light G, which has been transmitted by the green-channel optical modulator 16G, enters through the second entry surface 1804.

The light B, which has been transmitted by the blue-channel optical modulator 16B, enters through the third entry surface 1806.

The first and second dichroic mirror films 1810 and 1812 combine the light R, G, and B by reflecting or transmitting the light in accordance with the wavelength range of the light.

To be specific, the first dichroic mirror film 1810 transmits P-waves irrespective of the wavelength, reflects S-waves in the red wavelength range, and transmits S-waves outside the red wavelength range.

The second dichroic mirror film 1812 transmits P-waves irrespective of the wavelength, reflects S-waves in the blue wavelength range, and transmits S-waves outside the blue wavelength range.

Light that has been combined by the first and second dichroic mirror films 1810 and 1812 exits through the exit surface 1808.

Retardation Film 20

The retardation film 20, which is made of an organic material, is affixed to at least one of the first, second, and third entry surfaces 1802, 1804, and 1806 so as to convert the polarization direction of linearly polarized light.

The retardation film 20 can be affixed to an entry surface by using, for example, an adhesive coating formed on a back surface of the retardation film 20.

Various existing types of retardation films can be used as the retardation film 20. For example, the retardation film 20 may include a stacked layers of triacetyl cellulose (TAC) and polyvinyl alcohol (PVA) coated with a protection film of polyethylene terephthalate (PET).

The retardation film 20, which is affixed to the first and third entry surfaces 1802 and 1806, converts P-polarized light to S-polarized light.

Projection Optical System 23

The projection optical system 23 projects light that has exited the light combining unit 18 (through the exit surface 1808 of the light combining prism 18A) onto the screen S, so that an image is formed on the screen S.

Next, the operation of the projection optical system 23 is described.

The light source unit 12 emits light, and the separation unit 14 separates the light into the light R, G, and B.

The light R travels through the red-channel input polarizer, the red-channel optical modulator 16R, which modulates the light R, and the red-channel output polarizer 22R. Then, the light R reaches the retardation film 20.

The retardation film 20 converts the direction of linear polarization of the light R from P-polarized to S-polarized. Subsequently, the light R travels through the first entry surface 1802 toward the first and second dichroic mirror films 1810 and 1812.

Thus, the light R composed of S-waves is reflected by the first dichroic mirror film 1810 and transmitted by the second dichroic mirror film 1812, and travels through the exit surface 1808 toward the projection optical system 23.

The light G travels through the green-channel input polarizer 15G, the green-channel optical modulator 16G, which modulates the light G, and the green-channel output polarizer 22G.

In a state in which the polarization direction of the light G is aligned to that of P-waves, the light G travels through the second entry surface 1804 toward the first and second dichroic mirror films 1810 and 1812.

Thus, the light R composed of P-waves is transmitted by the first and second dichroic mirror films 1810 and 1812, and travels through the exit surface 1808 toward the projection optical system 23.

The light B travels through the blue-channel input polarizer 15B, the blue-channel optical modulator 16B, which modulates the light B, and the blue-channel output polarizer 22B, and the light B reaches the retardation film 20.

The retardation film 20 converts the direction of linear polarization of the light B from P-polarized to S-polarized. Subsequently, the light B travels through the third entry surface 1806 toward the first and second dichroic mirror films 1810 and 1812.

Thus, the light B composed of S-waves is reflected by the second dichroic mirror film 1812 and transmitted by the first dichroic mirror film 1810, and travels through the exit surface 1808 toward the projection optical system 23.

Next, the gist of the embodiment of the present invention is described.

As described above, in the embodiment, each of the first and second dichroic filters 32 and 34, and the first, second, and third reflection mirrors 36, 38, and 40 corresponds to an optical member. The embodiment of the present invention is applied to each of the optical members. Thus, the separation unit 14 in the embodiment corresponds to an optical unit.

Hereinafter, description is made using the third reflection mirror 40 as an example, wherein the third reflection mirror 40 is an example of an optical member 54.

The optical member 54 is disposed on the frame 52; the optical member 54 has a rectangular plate-shape having a width, a height, and a thickness; and the optical member 54 reflects light. If the first or the second dichroic filter 32 or 34 is used as an example of an optical member, the optical member transmits and reflects light.

Figure 5:
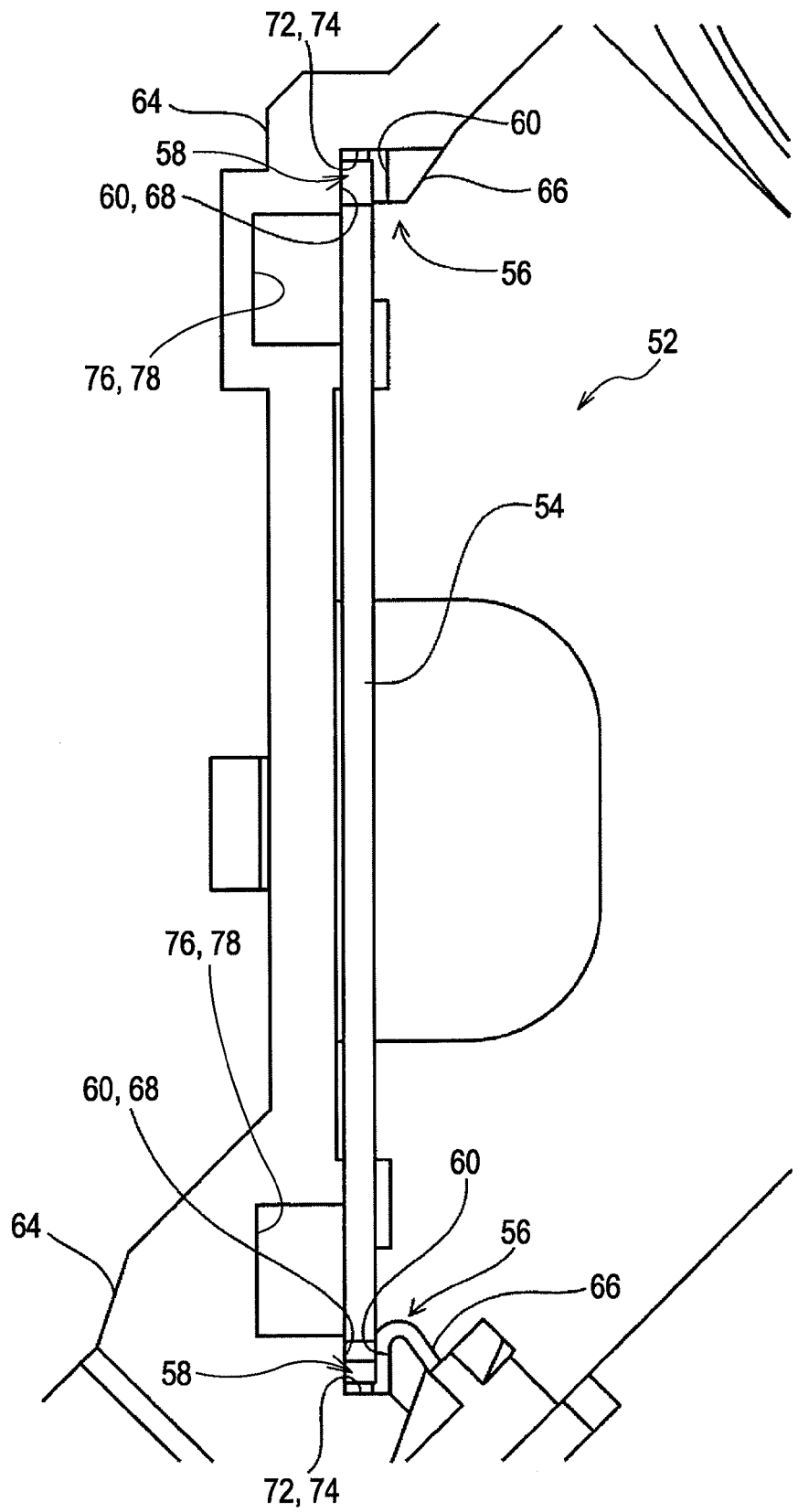
FIG. 5 is a view taken in the direction of arrow V of FIG. 4.
Figure 6:
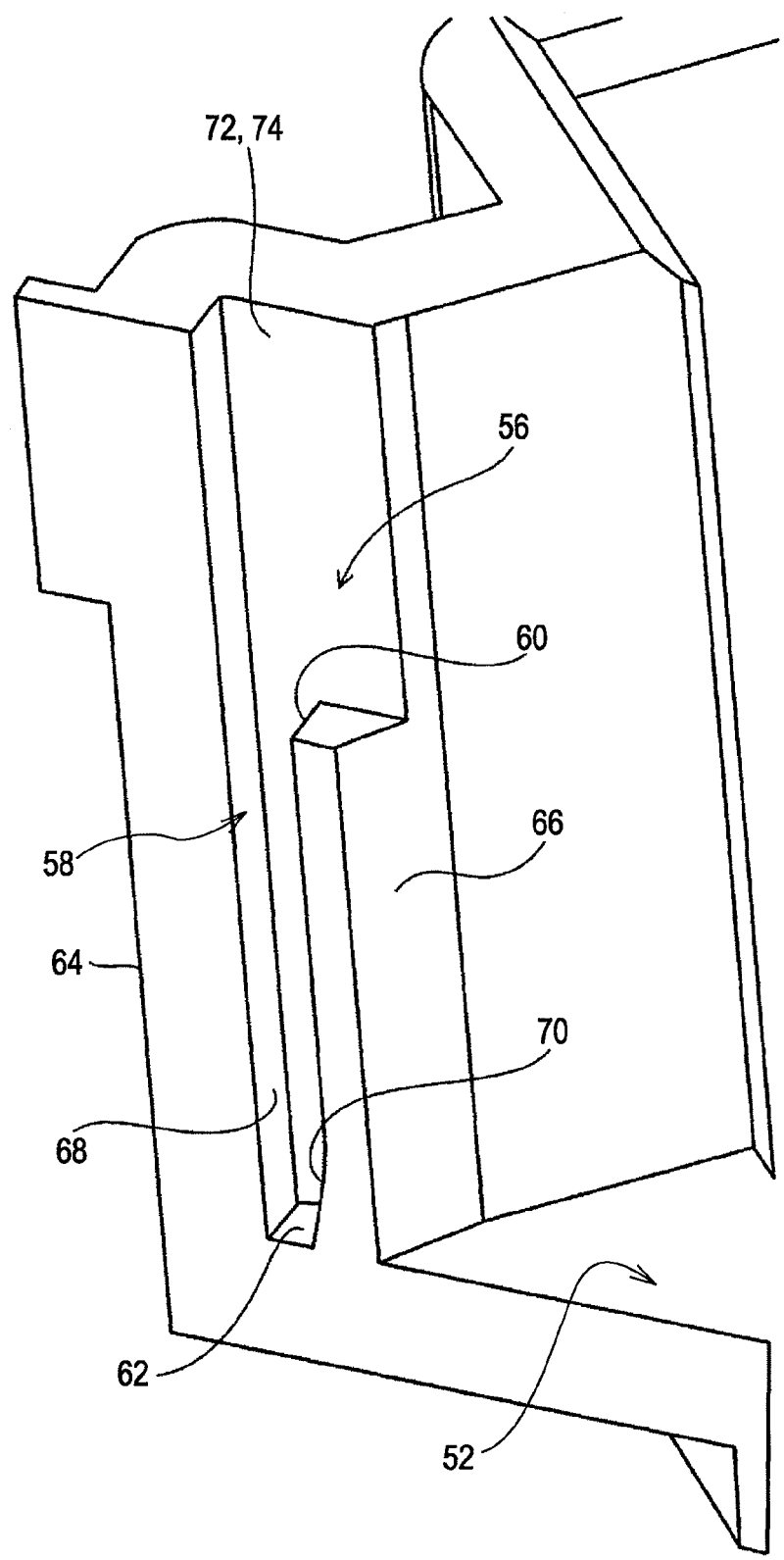
FIG. 6 is a perspective sectional view taken along line VI-VI of FIG. 4 excluding the optical member.
Figure 7:
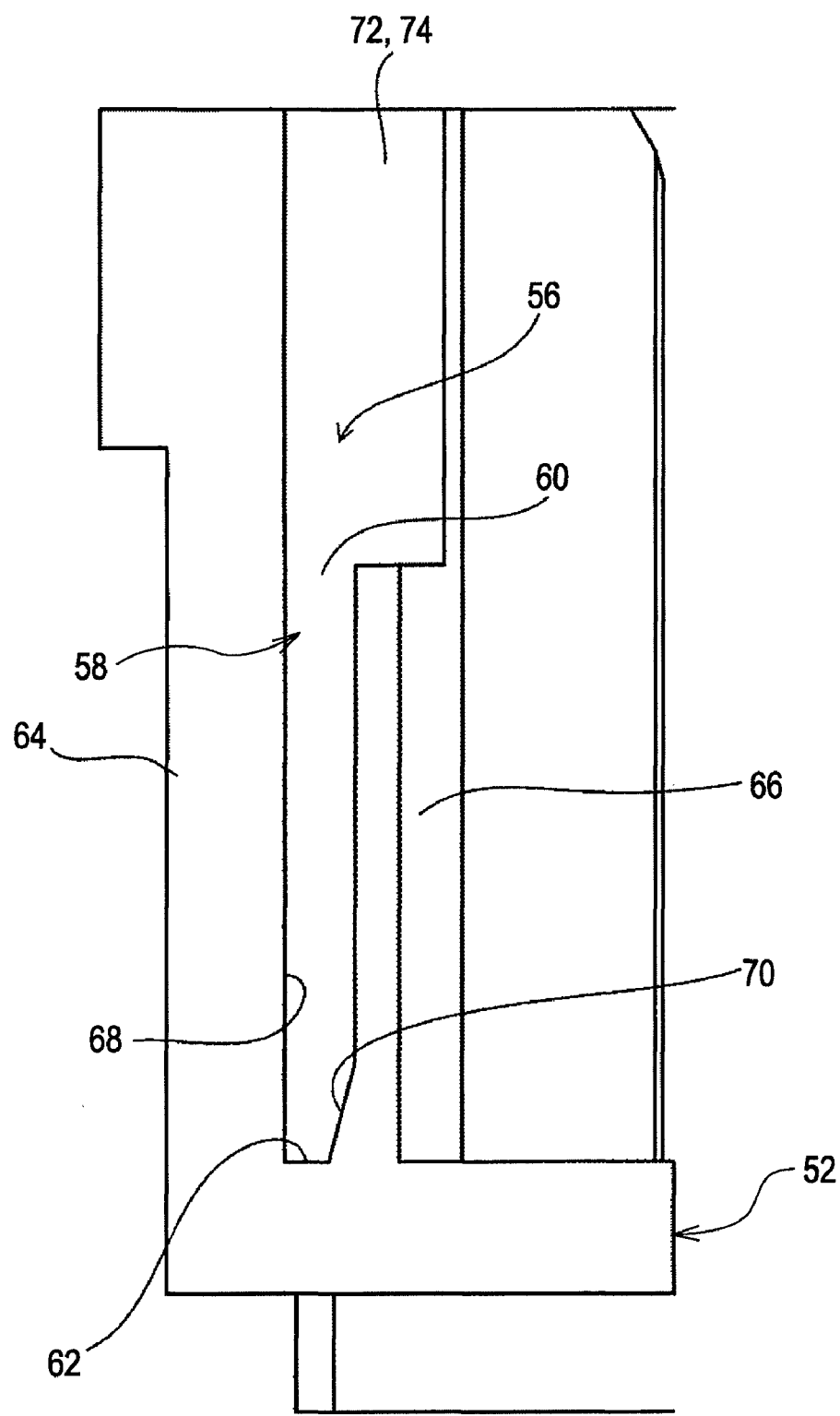
FIG. 7 is a sectional view taken along line VII-VII of FIG. 4 excluding the optical member.

FIG. 4 is a perspective view illustrating the mounting structure of the optical member 54. FIG. 5 is a view taken in the direction of arrow V of FIG. 4. FIG. 6 is a perspective sectional view taken along line VI-VI of FIG. 4 excluding the optical member 54. FIG. 7 is a sectional view taken along line VII-VII of FIG. 4 excluding the optical member 54.

Figure 8:
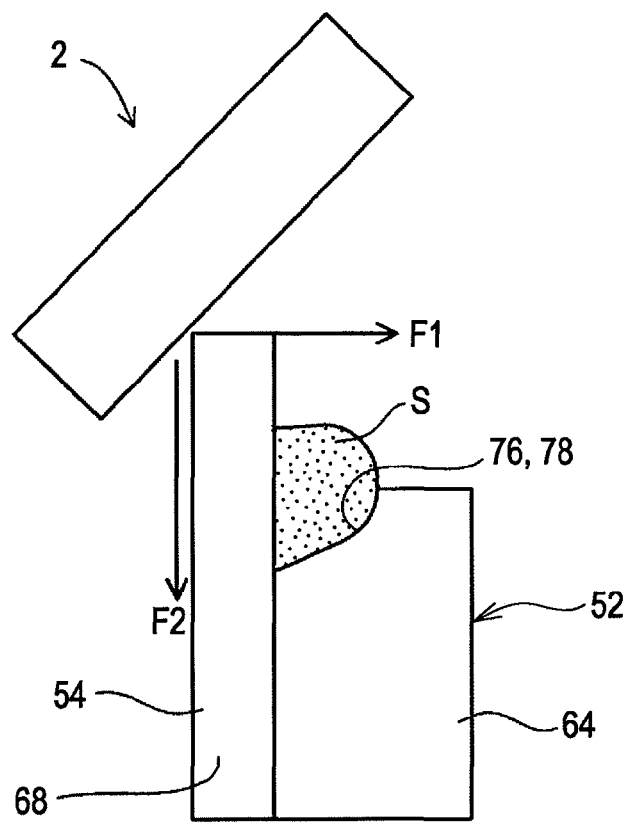
FIG. 8 is an explanatory view illustrating a state in which the optical member is pressed by a pressing jig.
Figure 9:
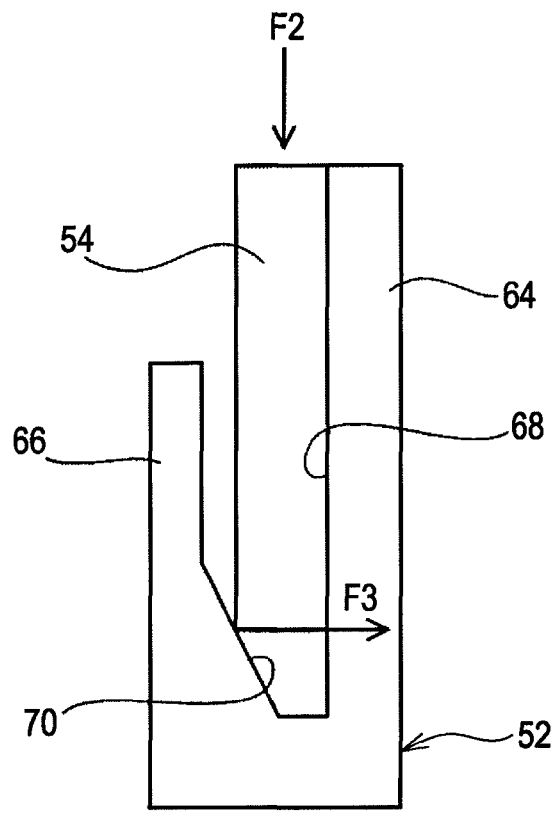
FIG. 9 is an explanatory view illustrating a state in which the optical member is in contact with an inclined surface and a thickness-direction positioning surface.
Figure 10:
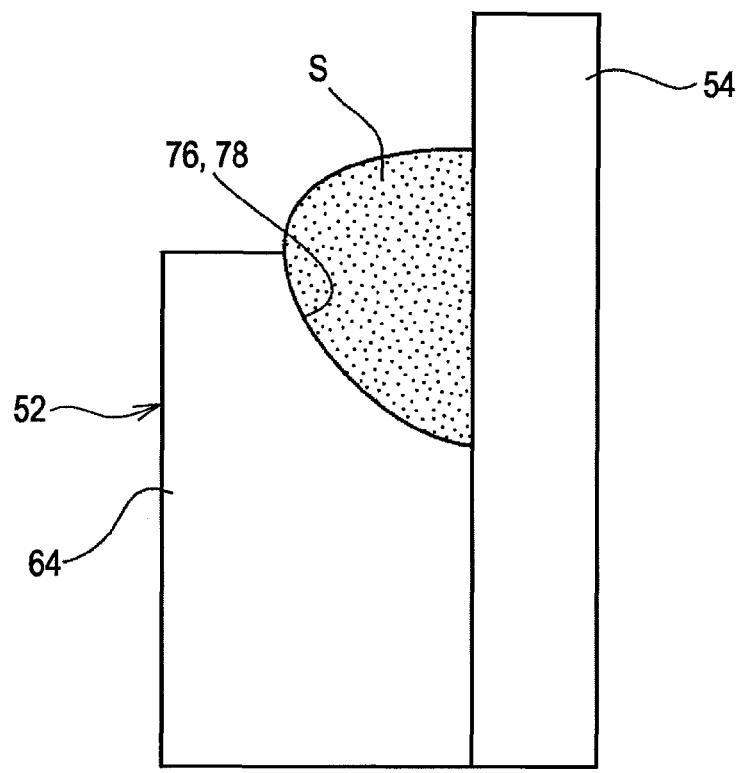
FIG. 10 is an explanatory view of an adhesive applied to a recess.

FIG. 8 is an explanatory view illustrating a state in which the optical member 54 is pressed by a pressing jig 2. FIG. 9 is an explanatory view illustrating a state in which the optical member 54 is in contact with an inclined surface and a thickness direction positioning surface. FIG. 10 is an explanatory view of an adhesive applied to a recess.

Figure 11:
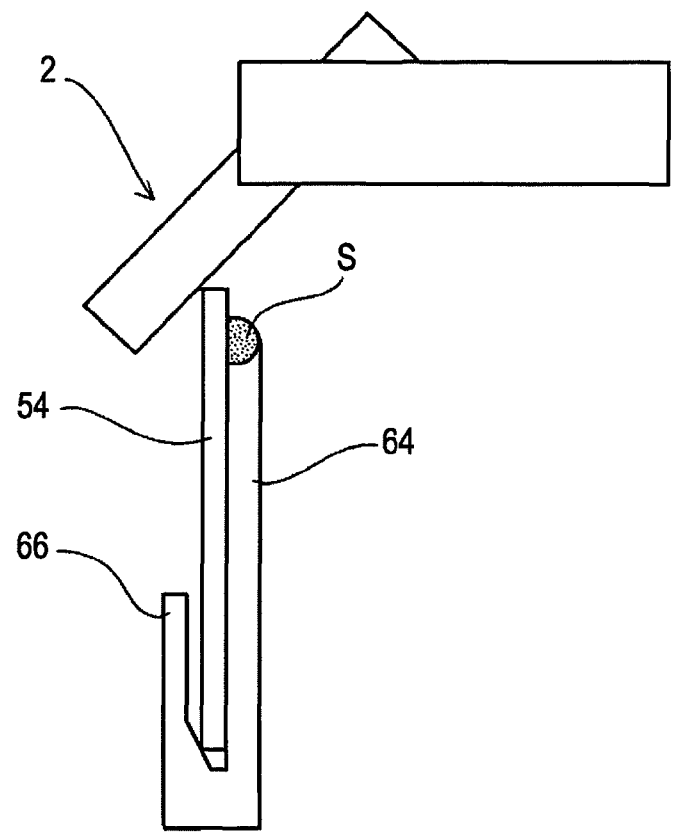
FIG. 11 is an explanatory view illustrating an operation of mounting the optical member.
Figure 12:
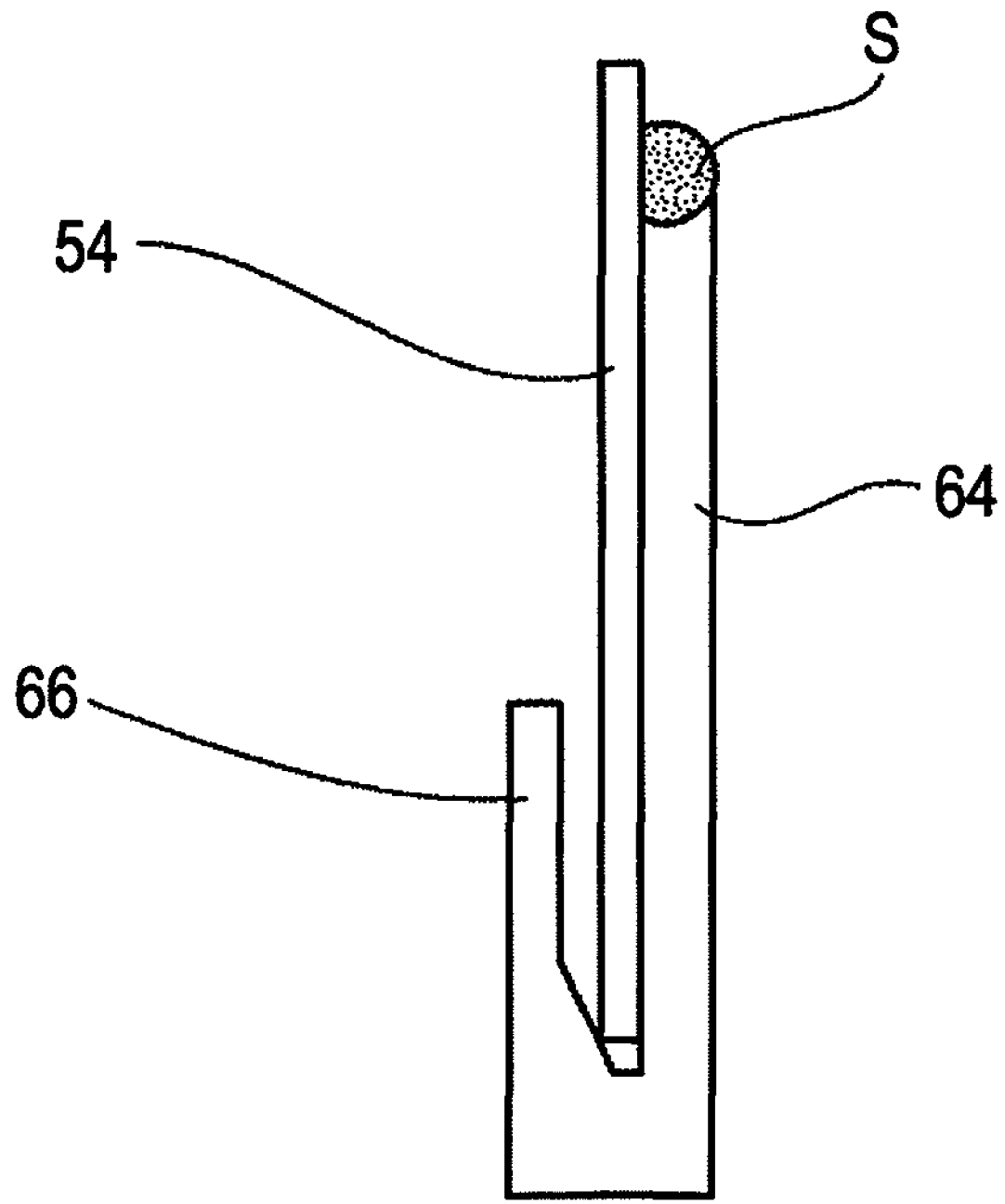
FIG. 12 is an explanatory view illustrating an operation of mounting the optical member.

FIGS. 11 and 12 are explanatory views illustrating an operation of mounting the optical member 54.

As shown in FIGS. 4 to 7, the frame 52 includes a pair of mount portions 56 each holding a side of the optical member 54 in the width direction.

Each of the mount portions 56 includes an insertion slot 58 into which an end of the optical member 54 in the width direction at least at an end of the optical member 54 in the height direction is inserted in the height direction of the optical member 54.

The insertion slot 58 includes an opening 60 and a bottom 62 facing each other in the depth direction of the insertion slot 58.

As shown in FIGS. 6 and 7, the insertion slot 58 is formed between a first wall 64 and a second wall 66 of the frame 52, the first and second walls 64 and 66 facing each other.

The height of the first wall 64 (the height of an end of the first wall 64 away from the bottom 62) is larger than the height of the second wall 66.

As shown in FIG. 4, in a state in which an end of the optical member 54 in the width direction at an end in the height direction is inserted into the insertion slot 58, the height of the first wall 64 is smaller than or equal to the height of the other end of the optical member 54 in the height direction. In other words, in a state in which an end of the optical member 54 in the width direction at an end in the height direction is inserted into the insertion slot 58, the height of the other end of the optical member 54 in the height direction is larger than or equal to the height of an end of the first wall 64 away from the bottom 62.

As shown in FIG. 7, the first wall 64 includes a thickness direction positioning surface 68. The thickness direction positioning surface 68 contacts one of the surfaces of the optical member 54 in the thickness direction when the optical member 54 is inserted into the insertion slot 58, so that the optical member 54 is positioned in the thickness direction.

The second wall 66 includes an inclined surface 70 near the bottom thereof. The inclined surface 70 is inclined such that the distance between the inclined surface 70 and the thickness direction positioning surface 68 decreases with decreasing distance from the bottom 62. The angle between the inclined surface 70 and the thickness direction positioning surface 68 is arbitrary.

However, if the angle between the inclined surface 70 and the thickness direction positioning surface 68 is adjusted so that the difference between force components F1 and F3 (described below) may be decreased, an advantage is obtained in that one of the surfaces of the optical member 54 stably presses against the thickness direction positioning surface 68.

In other words, if the angle between the inclined surface 70 and the thickness direction positioning surface 68 is adjusted so that the difference between the forces, respectively pressing upper and lower portions of one of the surfaces of the optical member 54 against the thickness direction positioning surface 68, may be decreased, an advantage is obtained in that the one of the surfaces of the optical member 54 stably presses against the thickness direction positioning surface 68.

An angle of, for example, approximately 13.5 degrees is effective, as the angle.

As shown in FIGS. 4 to 7, each of the pair of mount portions 56 includes a third wall 72, which faces an end surface at an end of the optical member 54 in the width direction when the optical member 54 is inserted into the insertion slot 58.

The third wall 72 includes a width direction positioning surface 74 that contacts an end surface of the optical member 54 in the width direction so as to position the optical member 54 in the width direction.

One of the surfaces of the optical member 54 is pressed against the thickness direction positioning surface 68. An end surface of the optical member 54 is pressed against the width direction positioning surface 74. Moreover, a lower end of the optical member 54, which is an end of the optical member 54 in the height direction on the other surface, is pressed against the inclined surface 70. In this state, as shown in FIG. 10, the optical member 54 is fixed to the frame 52 using an adhesive S applied therebetween.

Various existing adhesives can be used as the adhesive S. In the embodiment, a UV-curable adhesive, which cures rapidly, is used as the adhesive S so that the projector apparatus 10 can be assembled efficiently.

As shown in FIG. 8, in order to press one of the surfaces of the optical member 54 against the thickness direction positioning surface 68 and to press an end of the optical member 54 in the height direction on the other surface against the inclined surface 70, the pressing jig 2 is pressed against an upper end of the optical member 54 in the height direction on the other surface.

In the embodiment, as shown in FIG. 8, the adhesive S is applied to the frame 52 at a position at an end of the first wall 64 away from the bottom 62 and facing the optical member 54. The adhesive S is applied to the optical member 54 at a position at which the optical member 54 faces the first wall 64.

To be specific, as shown in FIGS. 4, 5, and 10, recesses 76 are formed at an end of the first wall 64 away from the bottom 62. The recesses 76 are open toward the second wall 66.

Each of the recesses 76 has a bottom surface that is curved, for example, cylindrically so that the bottom surface may have a large adhesion area and the adhesive strength may be increased.

The bottom surface of the recess 76 may be step-like. In this case, however, air gaps are easily formed between the adhesive S applied to the recess 76 and the bottom surface. Moreover, it is difficult to irradiate the entirety of the adhesive S with UV rays.

In contrast, if the bottom surface of the recess 76 is curved as in the embodiment, air gaps are prevented from being formed between the adhesive S applied to the recess 76 and the bottom surface of the recess 76, and the entirety of the adhesive S can be uniformly irradiated with UV rays, which are advantageous in securing the adhesive strength.

By thus forming the recesses 76 at an end of the first wall 64 away from the bottom 62, the adhesive S can be easily applied, which is advantageous in improving workability.

An adhesive slot 78 is formed by the recess 76 and one of the surfaces in the thickness direction of the optical member 54 inserted in the insertion slot 58.

By applying the adhesive S into the adhesive slot 78, the adhesive S is applied to the frame 52 and the optical member 54.

In order to use a UV-curable adhesive as the adhesive S, it is necessary that the adhesive S applied into the adhesive slot 78 have a thickness that allows the adhesive S to be sufficiently irradiated with UV rays by taking deep-section curability of the adhesive S into account. It is preferable that the thickness of the adhesive S be approximately 3 mm so that the adhesive S can be sufficiently cured and the adhesive strength can be secured.

Next, an operation of mounting the optical member 54 is described.

Sides of the optical member 54 in the width direction are inserted into the insertion slots 58 from above. Using a jig, as appropriate, an end surface of the optical member 54 in the width direction is pressed against the width direction positioning surface 74 so as to position the optical member 54 in the width direction.

As shown in FIG. 11, in a state in which a lower end of the optical member 54 is in contact with the inclined surface 70, the pressing jig 2 is pressed against an upper end on the other surface of the optical member 54 so as to apply a diagonally downward pressure to the upper end of the optical member 54.

Thus, as shown in FIG. 8, a force component F1 and a force component F2 are generated at the upper end of the optical member 54. The force component F1 is exerted in the direction in which one of the surfaces of the optical member 54 is pressed against the thickness direction positioning surface 68. The force component F2 is exerted downward (toward the bottom 62).

As shown in FIG. 9, when a lower end of the optical member 54 on the other surface of the optical member 54 is pressed against the inclined surface 70 by the force component F2, a force component F3 is generated at the lower end of the optical member 54 in the direction in which the one of the surfaces of the optical member 54 is pressed against the thickness direction positioning surface 68.

Thus, the force component F2 presses the lower end on the other surface of the optical member 54 against the inclined surface 70, so that the optical member 54 is positioned in the height direction. Moreover, the force components F1 and F3 press the one of the surfaces of the optical member 54 against the thickness direction positioning surface 68, so that the optical member 54 is positioned in the thickness direction.

In this state, the adhesive S is applied into the adhesive slot 78 and the adhesive S is irradiated with UV rays, thereby curing the adhesive S.

As shown in FIG. 12, after the adhesive S has cured, the pressing jig 2 is removed from the optical member 54. Thus, the optical member 54 is mounted on the frame 52.

With the optical unit of the embodiment, the optical member 54 is positioned using the thickness direction positioning surface 68 and the inclined surface 70 formed on the frame 52, and, in a state in which the optical member 54 has been positioned, the optical member 54 is mounted on the frame 52 using the adhesive S.

Therefore, two plate springs for fixing an optical member, which are used in the existing technique, are not necessary. Moreover, a lid member for fixing the optical member is not necessary.

Thus, spaces for plate springs are saved, which is advantageous in reducing the size and weight of the projector apparatus.

Moreover, since a large number of plate springs and lid members are not necessary, the cost of such components and the cost of assembling the components are reduced, which is advantageous in cost reduction.

Accordingly, the optical unit of the embodiment is suitable for a projector apparatus including a large number of optical members such as dichroic filters and reflection mirrors.

The present application contains subject matter related to that disclosed in Japanese Priority Patent Application JP 2008-308451 filed in the Japan Patent Office on Dec. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit comprising:
   a frame;
   an optical member disposed on the frame, the optical member having a rectangular plate-shape having a width, a height, and a thickness; and
   a pair of mount portions formed in the frame, each of the mount portions holding a side of the optical member in a width direction,
   wherein each of the mount portions includes an insertion slot into which an end of the optical member in the width direction at an end of the optical member in a height direction is inserted in the height direction,
   wherein the insertion slot includes an opening and a bottom facing each other in a depth direction of the insertion slot,
   wherein the insertion slot is formed between a first wall and a second wall of the frame, the first and second walls facing each other,
   wherein the first wall includes a thickness direction positioning surface that is in contact with one of the surfaces of the optical member in a thickness direction, the optical member being inserted into the insertion slot, so that the optical member is positioned in the thickness direction, wherein the second wall includes an inclined surface near the bottom of the insertion slot, the inclined surface being inclined such that the distance between the inclined surface and the thickness direction positioning surface decreases with decreasing distance from the bottom, and wherein the optical member is fixed to the frame using an adhesive applied between the frame and the optical member in a state in which the one of the surfaces of the optical member is pressed against the thickness direction positioning surface and an end of the optical member in the height direction on the other of the surfaces of the optical member in the thickness direction is pressed against the inclined surface.

2. The optical unit according to claim 1, wherein the adhesive is applied to the frame at a position at an end of the first wall away from the bottom and at which the first wall faces the optical member, and the adhesive is applied to the optical member at a position at which the optical member faces the first wall.

3. The optical unit according to claim 1, wherein, in a state in which the end of the optical member in the width direction at the end of the optical member in the height direction is inserted in the height direction, the height of the other end of the optical member in the height direction is larger than or equal to the height of an end of the first wall away from the bottom, wherein a recess is formed in the end of the first wall, the recess being open toward the second wall, wherein an adhesive slot is formed by the recess and the one of the surfaces of the optical member in the thickness direction, the optical member being inserted into the insertion slot, and wherein the adhesive is applied to the frame and the optical member by applying the adhesive into the adhesive slot.

4. The optical unit according to claim 1, wherein the height of the first wall is larger than the height of the second wall.

5. The optical unit according to claim 1, wherein one of the pair of mount portions includes a third wall facing an end surface of the optical member inserted into the insertion slot, the end surface located at an end of the optical member in the width direction, and wherein a width direction positioning surface is formed on the third wall, the width direction positioning surface positioning the optical member in the width direction by contacting the end surface of the optical member.

6. A projector apparatus comprising:

a light source unit;

a separation unit for separating light from the light source unit into a plurality of light beams having wavelength ranges different from each other;

a plurality of optical modulators each for modulating a corresponding one of the light beams, which has been separated by the separation unit, in accordance with an image information and outputting modulated light beam;

a light combining unit for combining the modulated light beams from the plurality of optical modulators; and a projection optical system for projecting light outputted from the light combining unit onto a screen, wherein the separation unit includes a frame, an optical member disposed on the frame, the optical member having a rectangular plate-shape having a width, a height, and a thickness, the optical member transmitting or reflecting light, and a pair of mount portions formed in the frame, each of the mount portions holding a side of the optical member in a width direction, wherein each of the mount portions includes an insertion slot into which an end of the optical member in the width direction at an end of the optical member in a height direction is inserted in the height direction, wherein the insertion slot includes an opening and a bottom facing each other in a depth direction of the insertion slot, wherein the insertion slot is formed between a first wall and a second wall of the frame, the first and second walls facing each other, wherein the first wall includes a thickness direction positioning surface that is in contact with one of the surfaces of the optical member in a thickness direction, the optical member being inserted into the insertion slot, so that the optical member is positioned in the thickness direction, wherein the second wall includes an inclined surface near the bottom of the insertion slot, the inclined surface being inclined such that the distance between the inclined surface and the thickness direction positioning surface decreases with decreasing distance from the bottom, and wherein the optical member is fixed to the frame using an adhesive applied between the frame and the optical member in a state in which the one of the surfaces of the optical member is pressed against the thickness direction positioning surface and an end of the optical member in the height direction on the other of the surfaces of the optical member in the thickness direction is pressed against the inclined surface.

* * * * *